United States Patent
Kimura (10) Patent No.: US 10,604,036 B2
(45) Date of Patent: Mar. 31, 2020

(54) VEHICLE SEAT

(71) Applicant: TOYOTA BOSHOKU KABUSHIKI KAISHA, Aichi-ken (JP)

(72) Inventor: Koji Kimura, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/110,340

(22) Filed: Aug. 23, 2018

(65) Prior Publication Data
US 2019/0077283 A1  Mar. 14, 2019

(30) Foreign Application Priority Data
Sep. 12, 2017 (JP) ................... 2017-174590

(51) Int. Cl.
| | |
|---|---|
| B60N 2/00 | (2006.01) |
| B60N 2/02 | (2006.01) |
| B60N 2/20 | (2006.01) |
| B60N 2/30 | (2006.01) |
| B60N 2/62 | (2006.01) |

(52) U.S. Cl.
CPC .......... *B60N 2/3045* (2013.01); *B60N 2/3011* (2013.01); *B60N 2/62* (2013.01)

(58) Field of Classification Search
CPC ....... B60N 2/3011; B60N 2/3045; B60N 2/62
USPC ........................................ 297/331, 334, 335
See application file for complete search history.

(56) References Cited

U.S. PATENT DOCUMENTS

| | | | | |
|---|---|---|---|---|
| 4,191,417 A | * | 3/1980 | Ferrara | B60N 2/3013 296/65.05 |
| 5,156,437 A | * | 10/1992 | Hayakawa | B60N 2/071 297/335 |
| 5,156,438 A | * | 10/1992 | Hayakawa | B60N 2/071 297/335 |
| 5,158,338 A | * | 10/1992 | Hayakawa | B60N 2/01591 297/335 |
| 5,195,802 A | * | 3/1993 | Hayakawa | B60N 2/366 297/335 X |
| 5,320,411 A | * | 6/1994 | Sera | A47C 11/005 297/331 |
| 5,800,015 A | * | 9/1998 | Tsuchiya | B60N 2/0715 297/331 X |
| 5,918,937 A | * | 7/1999 | Moffa | B60N 2/3047 297/331 X |

(Continued)

FOREIGN PATENT DOCUMENTS

JP  2013-136350  7/2013

*Primary Examiner* — Rodney B White
(74) *Attorney, Agent, or Firm* — Greenblum & Bernstein, P.L.C.

(57) ABSTRACT

A vehicle seat includes a seat back, a seat cushion, and a base. The seat cushion has a rear cushion portion, a front cushion portion, and a shaft support portion. The rear cushion portion has a rear upper surface and a front surface. The front cushion portion has a front upper surface and a rear surface. The shaft support portion extends in a seat width direction at a position below the front upper surface and forward of the rear surface. The shaft support portion is configured to support the front cushion portion so as to be pivotable. The front cushion portion pivots upward around the shaft support portion as the center of rotation, so that the front cushion portion is positioned in a tipped-up state.

6 Claims, 4 Drawing Sheets

(56) References Cited

U.S. PATENT DOCUMENTS

| | | | | |
|---|---|---|---|---|
| 5,997,083 A * | 12/1999 | Ono | B60N 2/309 | 297/236 |
| 6,012,771 A * | 1/2000 | Shea | B60N 2/36 | 296/65.05 |
| 6,386,629 B1 * | 5/2002 | Severinski | B60N 2/3011 | 297/188.1 |
| 6,663,179 B2 * | 12/2003 | Sunohara | B60N 2/3011 | 297/331 X |
| 6,767,061 B2 * | 7/2004 | Ogino | B60N 2/1839 | 297/331 X |
| 6,869,121 B2 * | 3/2005 | Kayumi | B60N 2/01 | 296/37.15 |
| 6,883,854 B2 * | 4/2005 | Daniel | B60N 2/01541 | 297/335 X |
| 6,883,868 B2 * | 4/2005 | Yoshida | B60N 2/065 | 297/331 |
| 6,916,057 B2 * | 7/2005 | Teich | B60N 2/3045 | 297/331 X |
| 6,935,691 B1 * | 8/2005 | Sasaki | B60N 2/0812 | 297/331 X |
| 7,040,702 B2 * | 5/2006 | Yamada | B60N 2/3009 | 297/331 X |
| 7,086,696 B2 * | 8/2006 | Yudovich | B60N 2/3047 | 297/335 |
| 7,252,318 B2 * | 8/2007 | Sumida | B60N 2/01 | 296/64 |
| 7,293,835 B2 * | 11/2007 | Yudovich | B60N 2/0155 | 297/335 X |
| 7,374,242 B2 * | 5/2008 | Champ | B60N 2/3031 | 297/331 X |
| 7,578,537 B2 * | 8/2009 | Baetz | B60N 2/3013 | 296/65.09 |
| 7,712,829 B2 * | 5/2010 | Park | B60N 2/01 | 296/65.13 |
| 7,780,234 B2 * | 8/2010 | Grable | B60N 2/305 | 297/331 X |
| 7,819,468 B2 * | 10/2010 | Tsuda | B60N 2/3047 | 297/331 X |
| 8,104,834 B2 * | 1/2012 | Moegling | B60N 2/20 | 297/331 X |
| 8,152,240 B2 * | 4/2012 | Yamada | B60N 2/22 | 297/335 X |
| 8,434,808 B2 * | 5/2013 | Abe | B60N 2/3013 | 297/331 X |
| 8,444,223 B2 * | 5/2013 | Moegling | B60N 2/3013 | 297/331 X |
| 8,573,674 B2 * | 11/2013 | Otsuka | B60N 2/0715 | 297/331 X |
| 8,646,840 B2 * | 2/2014 | Stojanovic | B60N 2/26 | 297/331 X |
| 9,079,516 B2 * | 7/2015 | Petit | B60N 2/305 | |
| 9,573,490 B1 * | 2/2017 | Poniatowski | B60N 2/2245 | |
| 10,065,536 B2 * | 9/2018 | Poniatowski | B60N 2/938 | |
| 10,336,220 B2 * | 7/2019 | Sera | B60N 2/995 | |
| 2005/0146186 A1 * | 7/2005 | Kinnou | B60N 2/065 | 297/331 |
| 2008/0100112 A1 * | 5/2008 | Hausler | B60N 2/2209 | 297/331 |
| 2012/0175930 A1 * | 7/2012 | Jovicevic | B60N 2/12 | 297/331 |
| 2017/0341543 A1 * | 11/2017 | Fujisawa | B60N 2/995 | |

* cited by examiner

VEHICLE SEAT

This nonprovisional application is based on Japanese Patent Application No. 2017-174590 filed on Sep. 12, 2017 with the Japan Patent Office, the entire contents of which are hereby incorporated by reference.

BACKGROUND

Field

The present specification relates to a vehicle seat in which a tipped-up state can be formed.

Description of the Background Art

Japanese Patent Laying-Open No. 2013-136350 discloses a technique regarding a vehicle seat. As disclosed in the document, a vehicle seat in which a tipped-up state can be formed has been known.

As the front end of a seat cushion is tipped up around the rear end of the seat cushion as a base point, the seat cushion is positioned in a tipped-up state. For example, when a seat cushion of a vehicle seat is positioned in the tipped-up state and the seat is entirely slid forward, the accessibility to the space provided rearward of the seat can be improved, and the space provided rearward of the seat can be increased.

SUMMARY

In the tipped-up state, it is desirable that the seat cushion and the seat back are folded up more compact. In other words, when the seat cushion is positioned in the tipped-up state or the seat cushion is in a tipped-up position, it is more desirable that the outline formed of the seat cushion and the seat back is smaller in size. For example, the vehicle seat can be positioned further forward, the accessibility to the space provided rearward of the seat can be further improved, and the space provided rearward of the seat can be further increased.

In a conventional vehicle seat, the seat cushion entirely pivots around the rear end of the seat cushion as a base point such that the front end of the seat cushion is tipped up, with the result that the seat cushion is positioned in the tipped-up state. The seat cushion positioned in the tipped-up state entirely extends obliquely upward from its rear end. Also, the seat cushion and the seat back form a V-shape.

In such a conventional vehicle seat, when the seat cushion entirely pivots, the rear side portion of the seat cushion and the lower portion of the seat back are more likely to come into contact with each other, and therefore, interfere with each other. Thus, it is not easy to decrease the angle that is formed between the seat cushion and the seat back. There is room for improvement in the conventional vehicle seat for the purpose of folding up the seat cushion and the seat back more compact in the tipped-up state.

The present specification aims to disclose a vehicle seat configured such that a seat cushion and a seat back can be folded up more compact in the tipped-up state.

A vehicle seat according to the present disclosure includes: a base; a seat back supported by the base; and a seat cushion supported by the base. The seat cushion includes: a rear cushion portion having a rear upper surface and a front surface that extends downward from a front end of the rear upper surface, the rear cushion portion being fixed to the base; a front cushion portion disposed forward of the rear cushion portion and having a front upper surface and a rear surface that extends downward from a rear end of the front upper surface; and a shaft support portion extending in a seat width direction at a position below the front upper surface and forward of the rear surface, the shaft support portion being configured to support the front cushion portion so as to be pivotable. In a sittable state in which the rear surface faces the front surface, the front upper surface and the rear upper surface form a sitting face. When the front cushion portion pivots upward around the shaft support portion as a center of rotation, the rear surface is spaced apart from the front surface and the front cushion portion is positioned in a tipped-up state.

The foregoing and other objects, features, aspects and advantages of the present specification will become more apparent from the following detailed description when taken in conjunction with the accompanying drawings.

DESCRIPTION OF THE PREFERRED EMBODIMENTS

A vehicle seat 10 in an embodiment will be hereinafter described with reference to FIGS. 1 to 4. In the following description, the same or corresponding components are designated by the same reference characters, and description thereof may not be repeated.

Embodiment

FIGS. 1 to 4 show arrows F, B, L, R, U, and D. The directions of arrows F, B, L, R, U, and D indicate the forward direction, the rearward direction, the leftward direction, the rightward direction, the upward direction, and the downward direction, respectively, seen from an occupant of a vehicle who sits on vehicle seat 10. The up-down direction of vehicle seat 10 corresponds to the direction shown by arrows U and D, and normally coincides with the height direction of the vehicle equipped with vehicle seat 10. The seat width direction of vehicle seat 10 corresponds to the direction indicated by arrows L and R, and normally coincides with the vehicle width direction of the vehicle equipped with vehicle seat 10. The front-rear direction of vehicle seat 10 corresponds to the direction indicated by arrows F and B, and normally coincides with the front-rear direction of the vehicle equipped with vehicle seat 10. The above-described directional relations indicated by the arrows are also applicable to FIGS. 5 to 7, which will be described later.

(Vehicle Seat 10)

Figure 1:
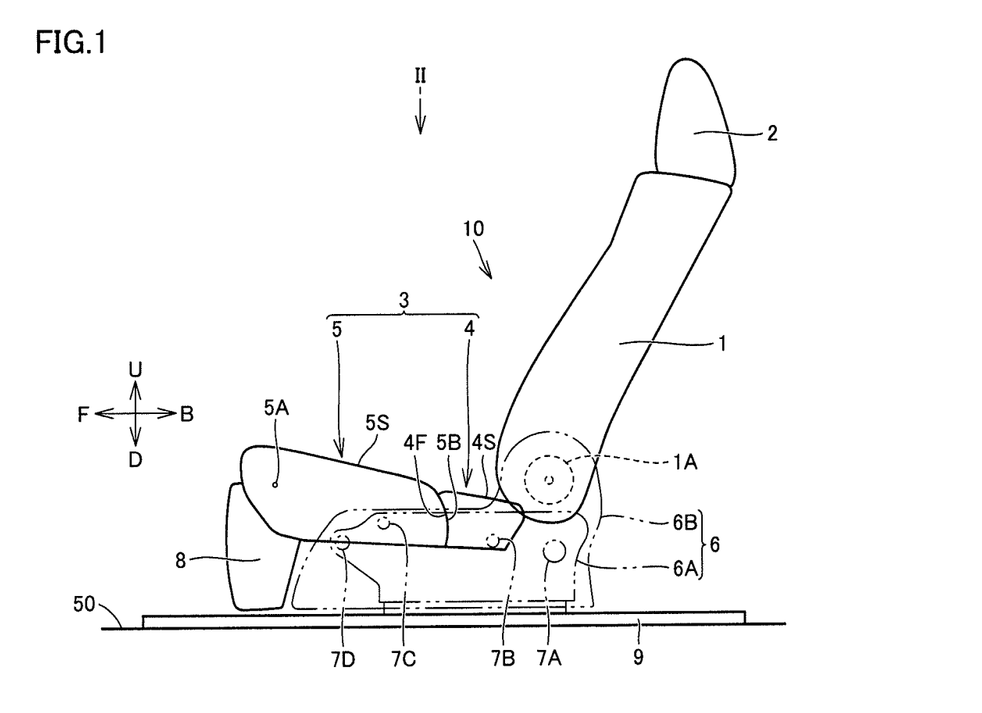
FIG. 1 is a side view showing a vehicle seat 10 in an embodiment.
Figure 2:
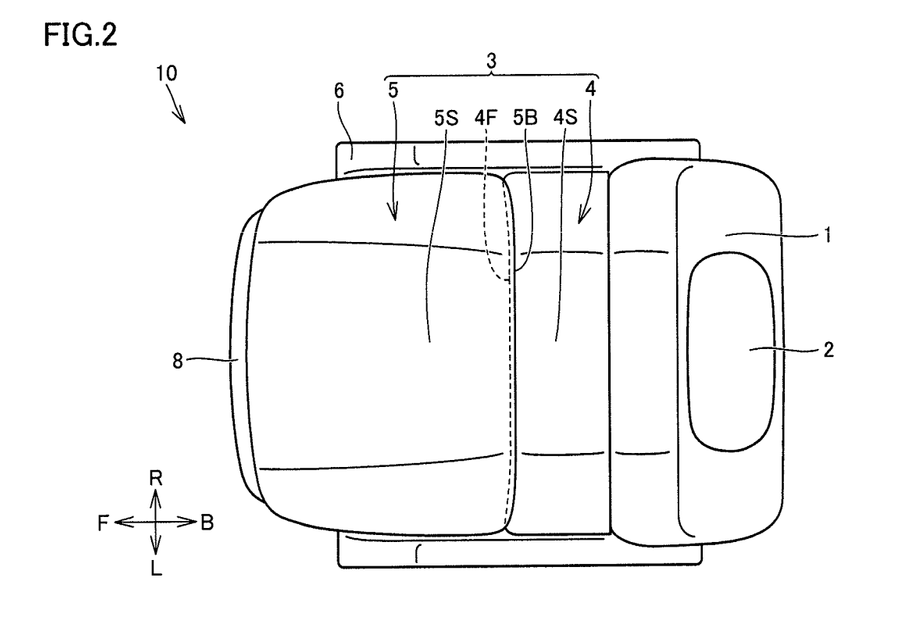
FIG. 2 is a plan view of vehicle seat 10 in the embodiment, which shows vehicle seat 10 as seen from the direction indicated by an arrow II in FIG. 1.

FIG. 1 is a side view showing a vehicle seat 10 in an embodiment. FIG. 2 is a plan view of vehicle seat 10 in the embodiment, which shows vehicle seat 10 as seen from the direction indicated by an arrow II in FIG. 1.

As shown in FIGS. 1 and 2, vehicle seat 10 includes a seat back 1, a headrest 2, a seat cushion 3, a base 6, a frame pipe 7A, an ottoman 8, and a slide mechanism 9 (FIG. 1). Seat back 1 has a backrest surface formed on its front surface. Headrest 2 is provided on seat back 1. Inside seat back 1, a back frame (not shown) is provided, which is configured to form the framework of seat back 1. The lower end of the back frame is coupled to base 6 (specifically, a base frame 6A described later) through a reclining device 1A (FIG. 1).

Seat back 1 is normally held in the state where the backrest angle to base frame 6A is fixed. For example, by operating a lever (not shown) provided at seat back 1, the fixed state of seat back 1 is released through a cable (not shown), so that seat back 1 is changed into the state where its backrest angle can be adjusted.

Base 6 is disposed on slide mechanism 9. Slide mechanism 9 is disposed on a vehicle floor 50, and configured to support seat back 1 and seat cushion 3 through base 6 such that seat back 1 and seat cushion 3 can slide in the front-rear direction. Base 6 includes a pair of right and left base frames 6A and a pair of right and left exterior covers 6B. Right and left exterior covers 6B respectively cover right and left base frames 6A. The pair of right and left base frames 6A is arranged such that right and left base frames 6A are respectively disposed on the right and left sides of seat cushion 3. Frame pipe 7A (FIG. 1) is a member forming a part of the framework of vehicle seat 10. Frame pipe 7A is disposed so as to extend in the seat width direction and is coupled to the pair of right and left base frames 6A.

(Seat Cushion 3)

Seat cushion 3 has a dividing configuration including a rear cushion portion 4 and a front cushion portion 5. Seat cushion 3 also has an upper surface provided with a sitting face on which an occupant of the vehicle can sit. Specifically, seat cushion 3 in the present embodiment includes rear cushion portion 4, front cushion portion 5, a support portion 7B, a shaft support portion 7C, and a stopper 7D. Each of support portion 7B, shaft support portion 7C and stopper 7D extends in the seat width direction, and is fixed to base frame 6A of base 6 directly or indirectly through a cushion frame (not shown) and the like.

Rear cushion portion 4 has a rear upper surface 4S and a front surface 4F that extends downward from the front end of rear upper surface 4S. Rear cushion portion 4 is fixed to base frame 6A of base 6 through support portion 7B, the cushion frame (not shown) and the like. Rear cushion portion 4 is fixed to base frame 6A so as not to be pivotable. Rear cushion portion 4 may be fixed to base frame 6A so as to be pivotable.

Front cushion portion 5 is disposed forward of rear cushion portion 4. Front cushion portion 5 has a front upper surface 5S and a rear surface 5B that extends downward from the rear end of front upper surface 5S. Front cushion portion 5 is fixed to base frame 6A of base 6 through shaft support portion 7C, the cushion frame (not shown) and the like. Front cushion portion 5 is fixed to base frame 6A by shaft support portion 7C so as to be pivotable. Shaft support portion 7C extends in the seat width direction at a position below front upper surface 5S and at a position forward of the position of rear surface 5B. Shaft support portion 7C supports front cushion portion 5 such that front cushion portion 5 is pivotable around shaft support portion 7C as the center of rotation.

An ottoman 8 is disposed at the front part of front cushion portion 5. A hinge portion 5A is provided at the position forward of shaft support portion 7C. Ottoman 8 is coupled to front cushion portion 5 via hinge portion 5A so as to be pivotable.

(Sittable State)

By the biasing force from a spring member (not shown) provided between front cushion portion 5 and base frame 6A, front cushion portion 5 is biased in the direction in which front cushion portion 5 is tipped up to the rearward of the seat around shaft support portion 7C as the center of rotation. In addition, front cushion portion 5 is provided with an engaging pin (not shown). This engaging pin is held in the state where the engaging pin is inserted into base frame 6A and engaged therewith. This leads to the state where front cushion portion 5 leans forward, that is, a sittable state where an occupant of the vehicle can sit thereon. Seat back 1 and front cushion portion 5 are held in the state where the angle to base frame 6A is fixed.

In the sittable state (the state shown in each of FIGS. 1 and 2), rear surface 5B and front surface 4F face each other and come into contact with each other. In this state, front upper surface 5S of front cushion portion 5 and rear upper surface 4S of rear cushion portion 4 form a sitting face on which an occupant of the vehicle can sit. In this state, front cushion portion 5 is supported by stopper 7D, so that the pivotal movement of front cushion portion 5 around shaft support portion 7C as the center of rotation in the counter-clockwise direction (in the counter-clockwise direction in FIG. 1) is restricted.

(Tipped-Up State)

Figure 3:
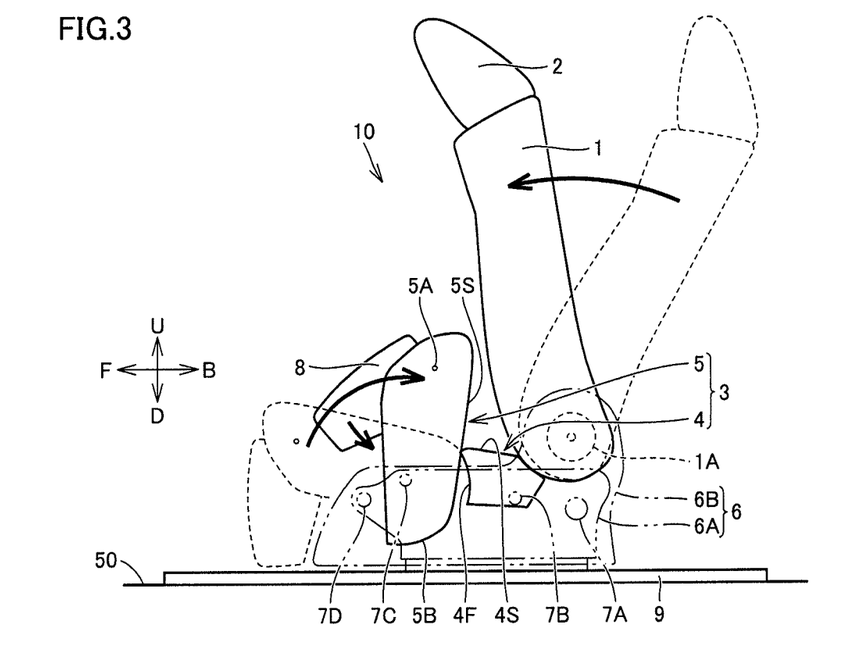
FIG. 3 is a side view showing the state where vehicle seat 10 in the embodiment is positioned in a tipped-up state.

Referring to FIG. 3, by operating a walk-in lever (not shown) provided at seat back 1 or the like, the fixed state of the backrest angle of seat back 1 is released through the cable (not shown). Seat back 1 leans forward around the position of reclining device 1A as the center of rotation, as indicated by an arrow in FIG. 3.

In addition to leaning forward of seat back 1, the above-mentioned engaging pin is operated through the cable (not shown), so that the engaging pin engaged with base frame 6A is disengaged. Thus, by the biasing force from the spring member, front cushion portion 5 pivots around shaft support portion 7C as the center of rotation such that front cushion portion 5 pivots upward to the rearward of the seat (see the arrow in FIG. 3).

By such a pivotal movement of front cushion portion 5, rear surface 5B of front cushion portion 5 is spaced apart from front surface 4F of rear cushion portion 4, and front cushion portion 5 is positioned in the tipped-up state. Ottoman 8 may also pivot around the position of hinge portion 5A as the center of rotation in the counter-clockwise direction (so as to be folded up relative to front cushion portion 5), as indicated by the arrow in FIG. 3.

In the state where front cushion portion 5 is positioned in the tipped-up state, the engaging pin may be provided so as to be capable of engaging with base frame 6A, so that front cushion portion 5 positioned in the tipped-up state may be fixed. When front cushion portion 5 is positioned in the tipped-up state, seat back 1 and front cushion portion 5 are located close to each other, so that vehicle seat 10 is folded up compact in the front-rear direction of the vehicle.

Figure 4:
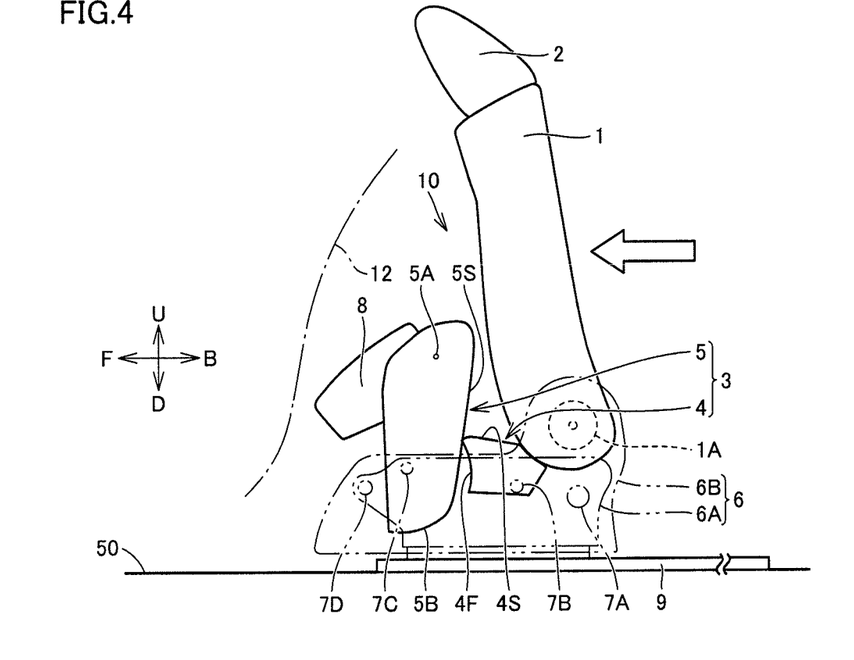
FIG. 4 is a side view showing the state where vehicle seat 10 (in the tipped-up state) in the embodiment slides forward.

Referring to FIG. 4, by operating the above-mentioned walk-in lever, the cable connected to this walk-in lever is together operated, so that the locking of the sliding movement by slide mechanism 9 is released. By releasing the locking of the sliding movement of base 6 along vehicle floor 50, seat back 1 and seat cushion 3 can be slid forward. Vehicle seat 10 is positioned forward (the position closer to a front seat 12) (see an outlined arrow in FIG. 4), so that the accessibility to the space provided rearward of the seat can be improved, and the space provided rearward of the seat can be increased.

Comparative Example

Figure 5:
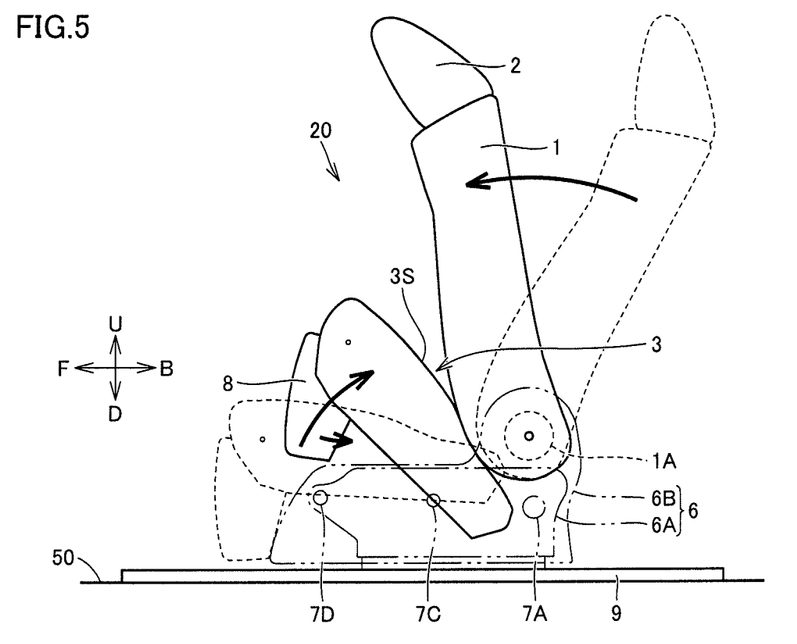
FIG. 5 is a side view showing a vehicle seat 20 in a comparative example.
Figure 6:
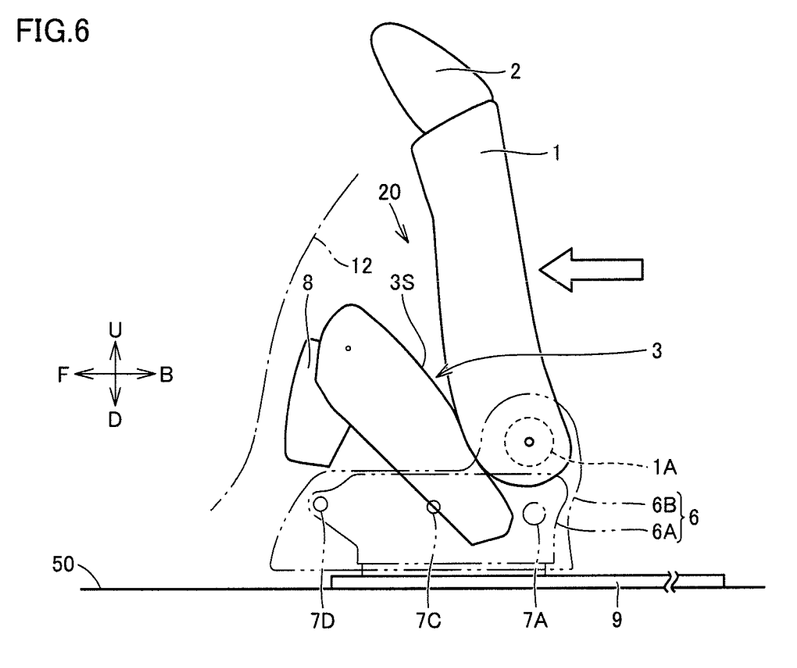
FIG. 6 is a side view showing the state where vehicle seat 20 (in the tipped-up state) in the comparative example slides forward.

The functions and effects achieved in the above-described embodiment will be hereinafter described as compared with the functions and effects achieved in a comparative example shown in FIGS. 5 and 6. FIG. 5 is a side view showing a vehicle seat 20 in the comparative example. FIG. 6 is a side view showing the state where vehicle seat 20 (in the tipped-up state) in the comparative example slides forward. Vehicle seat 20 in the comparative example and vehicle seat 10 in the embodiment are different from each other in the following points.

As shown in FIGS. 5 and 6, in vehicle seat 20 in the comparative example, seat cushion 3 does not have a dividing configuration including rear cushion portion 4 and front cushion portion 5. Shaft support portion 7C configured to support seat cushion 3 so as to be pivotable is provided at the position below an upper surface 3S of seat cushion 3 and at the rearward position in seat cushions 3. In the sittable state (the state indicated by a dotted line in FIG. 5), seat cushion 3 is supported by stopper 7D, so that the pivotal movement of seat cushion 3 around shaft support portion 7C as the center of rotation in the counter-clockwise direction (in the counter-clockwise direction in FIG. 5) is restricted.

The entire seat cushion 3 integrally pivots around the position of shaft support portion 7C as a base point such that the front end of seat cushion 3 is tipped up, so that seat cushion 3 is positioned in the tipped-up state. Seat cushion 3 positioned in the tipped-up state entirely extends obliquely upward from its rear end. Also, seat cushion 3 and seat back 1 form a V-shape.

In vehicle seat 20, when seat cushion 3 entirely pivots so as to be tipped up, the rear side portion of upper surface 3S of seat cushion 3 and the lower portion of seat back 1 are more likely to come into contact with each other, and therefore, interfere with each other. Thus, it is not easy to decrease the angle that is formed between seat cushion 3 and seat back 1.

Referring to FIG. 6, in order to allow vehicle seat 20 to be entirely positioned more forward, it is conceivable to further increase the angle at which seat cushion 3 pivots upward. In other words, when vehicle seat 20 is positioned forward, it is conceivable to provide a configuration in which seat cushion 3 and front seat 12 are positioned as far away as possible from each other, so as to prevent seat cushion 3 and front seat 12 from interfering with each other. When such a configuration is employed, seat cushion 3 is to be located closer to seat back 1 in the tipped-up state. Due to the existence of seat cushion 3, it becomes difficult to cause seat back 1 to lean more forward, with the result that expansion of the space provided rearward of vehicle seat 20 is restricted by the existence of seat back 1.

On the other hand, in order to allow expansion of the space provided rearward of vehicle seat 20, it is conceivable to configure seat back 1 such that seat back 1 can lean more forward. When such a configuration is employed, seat back 1 is to be located closer to seat cushion 3 in the tipped-up state. Due to the existence of seat back 1 that leans forward, it becomes difficult to increase the angle at which seat cushion 3 pivots upward, with the result that positioning of vehicle seat 20 to be entirely more forward is restricted by the existence of seat cushion 3.

Functions and Effects in Embodiment

Again referring to FIGS. 3 and 4, in contrast to the comparative example as described above, seat cushion 3 in the embodiment has a dividing configuration including rear cushion portion 4 and front cushion portion 5. Also, seat cushion 3 pivots around the position of shaft support portion 7C as a base point such that the front end of front cushion portion 5 is tipped up, with the result that seat cushion 3 is positioned in the tipped-up state. Seat cushion 3 positioned in the tipped-up state is configured such that only front cushion portion 5 extends upward from its rear end. Also, seat cushion 3 and seat back 1 entirely form an approximately J-shape.

In vehicle seat 10 in the embodiment, front cushion portion 5 is tipped up in the state where front upper surface 5S of front cushion portion 5 and the lower portion of seat back 1 are sufficiently spaced apart from each other. Even when front cushion portion 5 pivots so as to be tipped up, seat back 1 and front cushion portion 5 can be moved closer to each other until front upper surface 5S of front cushion portion 5 comes in contact with seat back 1. Thus, front cushion portion 5 can pivot upward at a large angle so as to be positioned in the tipped-up state.

Therefore, in vehicle seat 10 positioned in the tipped-up state, seat cushion 3 (front cushion portion 5) and seat back 1 can be folded up compact as compared with the comparative example. When vehicle seat 10 is positioned in the tipped-up state, the outline formed of seat cushion 3 and seat back 1 is smaller than that in the comparative example. Vehicle seat 10 can be located more forward than vehicle seat 20. The space behind and below front seat 12 can be more effectively utilized. Also, the accessibility to the space provided rearward of the seat is higher than that in vehicle seat 20, and the space provided rearward of the seat can also be further increased. Although ottoman 8 is not an indispensable configuration in vehicle seat 10, the above-described effects may be favorable as particularly advantageous effects in the case where vehicle seat 10 includes ottoman 8.

As to the arrangement position of frame pipe 7A that forms a part of the framework of vehicle seat 10, frame pipe 7A is disposed below reclining device 1A. The same also applies to vehicle seat 20 in the comparative example (see FIG. 5). The flexibility of the arrangement position of frame pipe 7A is higher in vehicle seat 10 than in vehicle seat 20. In other words, in the case of vehicle seat 20 in the comparative example, the range of the pivotal movement of seat cushion 3 reaches the position in the vicinity of the area below reclining device 1A (see FIG. 5). Thus, it is not easy to change the arrangement position of frame pipe 7A from the position shown in FIG. 5 to the position forward thereof.

On the other hand, in the case of vehicle seat 10 in the embodiment, the range of the pivotal movement of front cushion portion 5 is spaced apart from frame pipe 7A. Frame pipe 7A can be positioned, for example, below rear cushion portion 4. Even when the arrangement position of frame pipe 7A is changed, for example, to the position below rear cushion portion 4, the pivotal movement of front cushion portion 5 is not prevented by the existence of frame pipe 7A.

As shown in FIG. 1, in the case where vehicle seat 10 is in the sittable state, and when front surface 4F of rear cushion portion 4 and rear surface 5B of front cushion portion 5 are seen from the direction parallel to the seat width direction, front surface 4F may have a concave surface shape that is curved such that an intermediate portion in the up-down direction of front surface 4F is recessed rearward, and rear surface 5B may have a convex surface shape that is curved such that an intermediate portion in the up-down direction of rear surface 5B bulges rearward. According to the above-described configuration, when front cushion portion 5 pivots around shaft support portion 7C as the center of rotation, front surface 4F and rear surface 5B come into sliding contact with each other, so that the pivotal movement of front cushion portion 5 is hardly prevented thereby.

(Modification)

Figure 7:
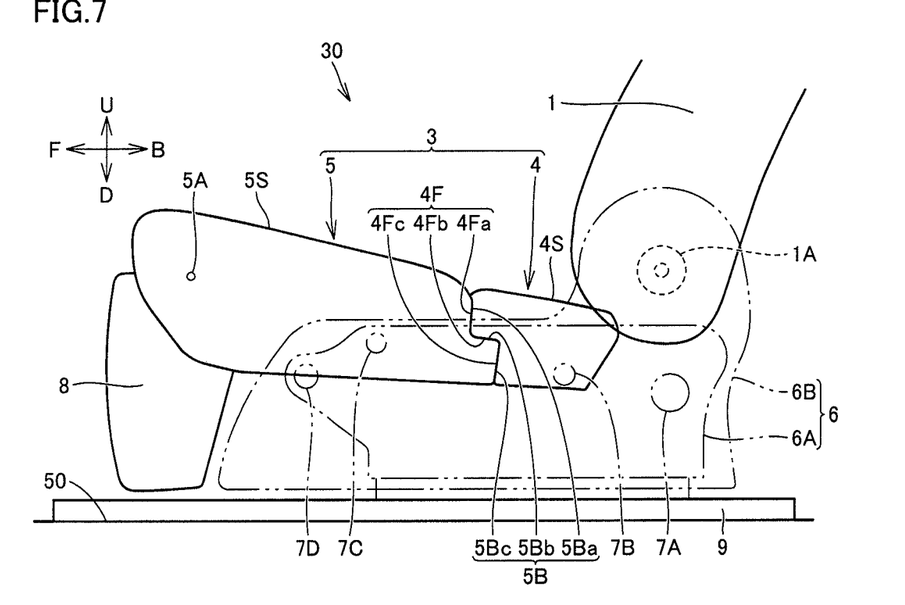
FIG. 7 is a side view showing a vehicle seat 30 in a modification of the embodiment.

FIG. 7 is a side view showing a vehicle seat 30 in a modification of the embodiment. Vehicle seat 10 in the embodiment and vehicle seat 30 in the present modification are different from each other in the configurations of front surface 4F and rear surface 5B.

In vehicle seat 30 in the present modification, front surface 4F includes a first upper portion 4Fa, a first intermediate portion 4Fb, and a first lower portion 4Fc, and rear surface 5B includes a second upper portion 5Ba, a second intermediate portion 5Bb, and a second lower portion 5Bc.

First upper portion 4Fa extends downward from the front end of rear upper surface 4S of rear cushion portion 4. First intermediate portion 4Fb extends rearward from the end of first upper portion 4Fa that is located on the opposite side of rear upper surface 4S. First lower portion 4Fc extends downward from the end of first intermediate portion 4Fb that is located on the opposite side of first upper portion 4Fa.

Second upper portion 5Ba extends downward from the rear end of front upper surface 5S of front cushion portion 5. Second intermediate portion 5Bb extends rearward from the end of second upper portion 5Ba that is located on the opposite side of front upper surface 5S. Second lower portion 5Bc extends downward from the end of second intermediate portion 5Bb that is located on the opposite side of second upper portion 5Ba.

When vehicle seat 30 is in the sittable state, first upper portion 4Fa and second upper portion 5Ba face each other; first intermediate portion 4Fb and second intermediate portion 5Bb face each other; and first lower portion 4Fc and second lower portion 5Bc face each other. By the pivotal movement of front cushion portion 5, rear surface 5B of front cushion portion 5 is spaced apart from front surface 4F of rear cushion portion 4, and front cushion portion 5 is positioned in the tipped-up state.

Also by the above-described configuration, the same functions and effects as those in the above-described embodiment can be achieved. In the sittable state, and when the portion (dividing line) between rear cushion portion 4 and front cushion portion 5 is seen from above, first intermediate portion 4Fb serves as a blind cover. Thus, the space below seat cushion 3 is not visible through the dividing line between rear cushion portion 4 and front cushion portion 5. Accordingly, it is expected to achieve an improved aesthetic appearance as compared with the embodiment (vehicle seat 10). Furthermore, the existence of first intermediate portion 4Fb can effectively suppress that a smart phone or the like falls through the above-mentioned dividing line down to the area below seat cushion 3.

The following is a summarized explanation about the above-described details of the present disclosure.

A vehicle seat according to the present disclosure includes: a base; a seat back supported by the base; and a seat cushion supported by the base. The seat cushion includes: a rear cushion portion having a rear upper surface and a front surface that extends downward from a front end of the rear upper surface, the rear cushion portion being fixed to the base; a front cushion portion disposed forward of the rear cushion portion and having a front upper surface and a rear surface that extends downward from a rear end of the front upper surface; and a shaft support portion extending in a seat width direction at a position below the front upper surface and forward of the rear surface, the shaft support portion being configured to support the front cushion portion so as to be pivotable. In a sittable state in which the rear surface faces the front surface, the front upper surface and the rear upper surface form a sitting face. When the front cushion portion pivots upward around the shaft support portion as a center of rotation, the rear surface is spaced apart from the front surface and the front cushion portion is positioned in a tipped-up state.

According to the vehicle seat, when the tipped-up state is formed, the rear side portion of the upper surface of the seat cushion and the lower portion of the seat back are spaced apart from each other, and therefore, less likely to come into contact with each other. Accordingly, the seat cushion and the seat back can be folded up compact.

In the vehicle seat, when the front surface and the rear surface are seen from a direction parallel to the seat width direction, the front surface may have a concave surface shape that is curved such that an intermediate portion in an up-down direction of the front surface is recessed rearward, and the rear surface may have a convex surface shape that is curved such that an intermediate portion in an up-down direction of the rear surface bulges rearward.

According to the above-described configuration, when the front cushion portion pivots around the shaft support portion as the center of rotation, the front surface and the rear surface smoothly come into sliding contact with each other, so that the pivotal movement of the front cushion portion is hardly prevented thereby.

In the vehicle seat, the front surface has a first upper portion extending downward from the front end of the rear upper surface, a first intermediate portion extending rearward from an end of the first upper portion that is located on an opposite side of the rear upper surface, and a first lower portion extending downward from an end of the first intermediate portion that is located on an opposite side of the first upper portion. The rear surface has a second upper portion extending downward from the rear end of the front upper surface, a second intermediate portion extending rearward from an end of the second upper portion that is located on an opposite side of the front upper surface, and a second lower portion extending downward from an end of the second intermediate portion that is located on an opposite side of the second upper portion. In the sittable state, the first upper portion and the second upper portion face each other, the first intermediate portion and the second intermediate portion face each other, and the first lower portion and the second lower portion face each other.

According to the above-described configuration, when the portion between the rear cushion portion and the front cushion portion is seen from above, the first intermediate portion serves as a blind cover, so that it is expected to achieve an improved aesthetic appearance. Also, the existence of the first intermediate portion can suppress that an object falls through the gap between the rear cushion portion and the front cushion portion down to the area below the seat cushion.

The vehicle seat may further include an ottoman provided at a front part of the front cushion portion.

Due to the existence of the ottoman, it becomes difficult to fold up the vehicle seat compact, which however can be implemented according to the vehicle seat having the above-described configuration, with the result that a remarkable advantage can be achieved.

Although the embodiments of the present disclosure have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A vehicle seat comprising:
    a base;
    a seat back supported by the base; and
    a seat cushion supported by the base, the seat cushion comprising:
        a rear cushion portion having a rear upper surface and a front surface that extends downward from a front end of the rear upper surface, the rear cushion portion being fixed to the base,
        a front cushion portion disposed forward of the rear cushion portion and having a front upper surface and a rear surface that extends downward from a rear end of the front upper surface, and
        a shaft support portion extending in a seat width direction at a position below the front upper surface and forward of the rear surface, the shaft support portion being configured to support the front cushion portion so as to be pivotable, wherein
    in a sittable state in which the rear surface faces the front surface, the front upper surface and the rear upper surface form a sitting face, and
    when the front cushion portion pivots upward around the shaft support portion as a center of rotation between the sittable state and a tipped up state, a front end surface of the front cushion portion is moved rearwardly and a rear surface of the rear cushion portion is spaced apart from the front surface of the rear cushion portion.

2. The vehicle seat according to claim 1, wherein
    when the front surface and the rear surface are seen from a direction parallel to the seat width direction,
    the front surface has a concave surface shape that is curved such that an intermediate portion in an up-down direction of the front surface is recessed rearward, and
    the rear surface has a convex surface shape that is curved such that an intermediate portion in an up-down direction of the rear surface bulges rearward.

3. The vehicle seat according to claim 2, further comprising an ottoman provided at a front part of the front cushion portion.

4. The vehicle seat according to claim 1, wherein
    the front surface comprises:
        a first upper portion extending downward from the front end of the rear upper surface, a first intermediate portion extending rearward from an end of the first upper portion that is located on an opposite side of the rear upper surface, and a first lower portion extending downward from an end of the first intermediate portion that is located on an opposite side of the first upper portion,
    the rear surface comprises:
        a second upper portion extending downward from the rear end of the front upper surface, a second intermediate portion extending rearward from an end of the second upper portion that is located on an opposite side of the front upper surface, and a second lower portion extending downward from an end of the second intermediate portion that is located on an opposite side of the second upper portion,
    and
    in the sittable state, the first upper portion and the second upper portion face each other, the first intermediate portion and the second intermediate portion face each other, and the first lower portion and the second lower portion face each other.

5. The vehicle seat according to claim 4, further comprising an ottoman provided at a front part of the front cushion portion.

6. The vehicle seat according to claim 1, further comprising an ottoman provided at a front part of the front cushion portion.

* * * * *